(12) United States Patent
Wiseman

(10) Patent No.: US 6,510,831 B2
(45) Date of Patent: Jan. 28, 2003

(54) HYPOCYCLOID ENGINE

(75) Inventor: Randall Wiseman, Waveland, MS (US)

(73) Assignee: Wiseman Technologies, Inc., Waveland, MS (US)

( * ) Notice: Subject to any disclaimer, the term of this patent is extended or adjusted under 35 U.S.C. 154(b) by 26 days.

(21) Appl. No.: 09/777,906

(22) Filed: Feb. 7, 2001

(65) Prior Publication Data

US 2001/0035149 A1 Nov. 1, 2001

Related U.S. Application Data
(60) Provisional application No. 60/181,112, filed on Feb. 8, 2000.

(51) Int. Cl.$^7$ .................................................. F02B 75/32
(52) U.S. Cl. ...................................... 123/197.4; 74/52
(58) Field of Search ............................ 123/197.1, 197.4; 74/52

(56) References Cited

U.S. PATENT DOCUMENTS

| | | |
|---|---|---|
| 1,579,083 A | 3/1926 | Collins |
| 3,626,786 A | 12/1971 | Kinoshita et al. |
| 3,791,227 A * | 2/1974 | Cherry ................... 123/192.2 |
| 3,886,805 A | 6/1975 | Koderman |
| 4,085,628 A | 4/1978 | McWhorter |
| 4,163,399 A | 8/1979 | Yamada et al. |
| 4,236,416 A | 12/1980 | Barcita |
| 4,237,741 A | 12/1980 | Huf et al. |
| 4,708,096 A | 11/1987 | Mroz |
| 4,803,964 A | 2/1989 | Kurek et al. |
| 4,850,313 A | 7/1989 | Gibbons |
| 4,909,206 A | 3/1990 | Parsons |
| 5,158,046 A | 10/1992 | Rucker |
| 5,203,287 A | 4/1993 | Wiley |
| 5,375,564 A | 12/1994 | Gail |
| 5,406,916 A | 4/1995 | Rodrigues |
| 5,560,332 A | 10/1996 | Chang |
| 5,603,298 A | 2/1997 | Kawamura |
| 5,749,262 A | 5/1998 | Galvin |
| 5,785,029 A | 7/1998 | Fischer |
| 5,865,060 A | 2/1999 | Osborne |
| 5,937,734 A | 8/1999 | Stiefel et al. |
| 5,941,203 A | 8/1999 | Sato |
| 5,941,223 A | 8/1999 | Kato |
| 5,943,989 A | 8/1999 | Kira |
| 5,947,066 A | 9/1999 | Ishikawa |
| 5,947,068 A | 9/1999 | Araki |
| 6,098,477 A | 8/2000 | Takachi et al. |

FOREIGN PATENT DOCUMENTS

| | | | |
|---|---|---|---|
| CH | 231110 | * 2/1944 | .................... 74/52 |

* cited by examiner

*Primary Examiner*—Noah P. Kamen
(74) *Attorney, Agent, or Firm*—Blank Rome LLP

(57) ABSTRACT

A hypocycloid gear assembly for converting pure linear motion to rotational motion having a pinion shaft, a pinion carrier, and a ring gear. The pinion shaft has a pinion journal which moves in a purely linear direction. A pinion body is connected to the pinion journal and is offset therefrom. The pinion body is placed inside a carrier body of the pinion carrier. The pinion body rotates around the center of axis of the carrier body, causing the carrier body to rotate on its own axis. An output shaft, whose centerline coincides with the centerline of the carrier body, rotates on its own axis and has a purely rotational motion.

25 Claims, 7 Drawing Sheets

0 DEGREES - TOP

90 DEGREES - POWER STROKE

180 DEGREES - BOTTOM STROKE

270 DEGREES - UP STROKE

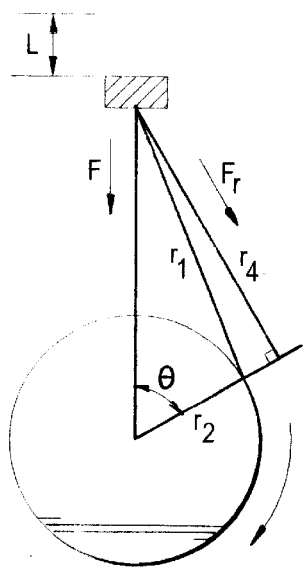
FIG. 9A
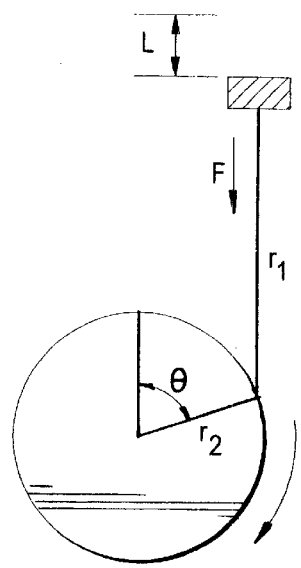
FIG. 9B
FIG. 10
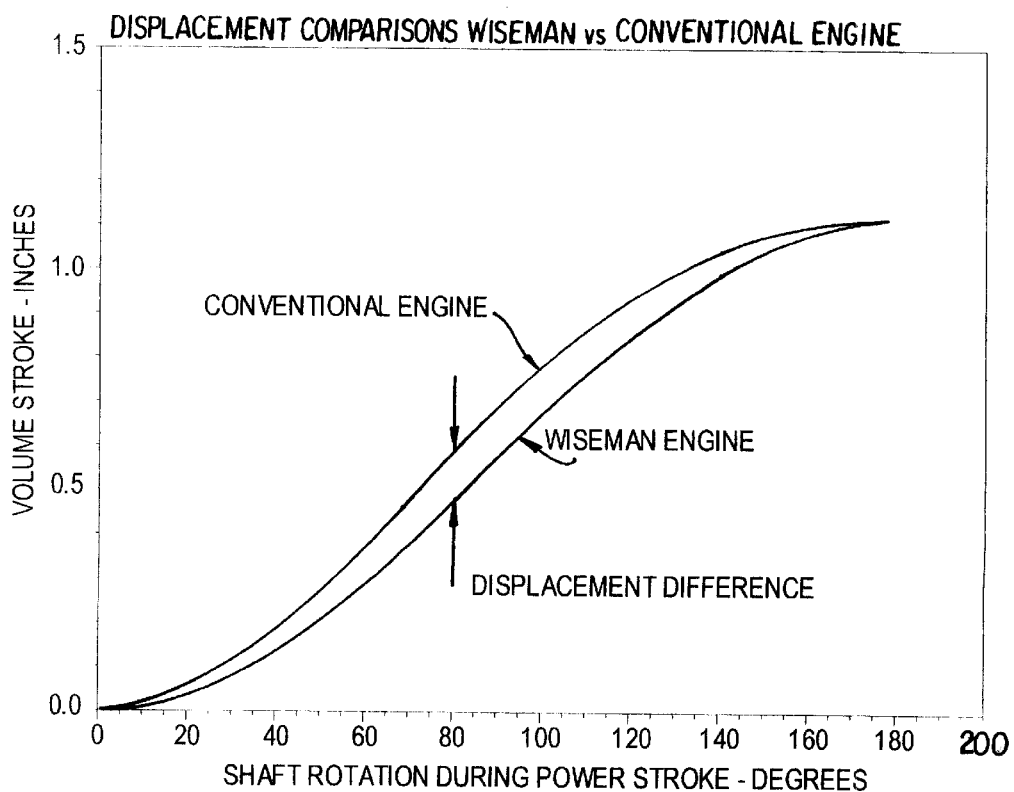

HYPOCYCLOID ENGINE

CROSS REFERENCE TO RELATED APPLICATION

This application claims priority to provisional application 60/181,112 filed on Feb. 8, 2000.

FIELD OF INVENTION

The present invention relates to a hypocycloid gear assembly used in internal combustion engines. The gear assembly is able to transfer power from a purely linear reciprocating piston to a purely rotational output shaft, increasing the efficiency and stability of the gear assembly and engine.

BACKGROUND OF THE INVENTION

Conventional reciprocating piston engines and gear mechanisms are well known in the prior art. In the conventional engine, the connecting rod joins the piston to the gear assembly and assumes a slightly canted position during the piston cycle. This is caused by the linear motion of the piston on one end of the connecting rod and the circular motion of the gear assembly on the other end of the connecting rod. The canting or offset of the connecting rod reduces the driving force transferred from the piston to the gear assembly, because part of the force in the piston is dissipated in a lateral direction of the connecting rod. The canting also produces piston side loading which increases the amount of friction between the piston and the walls of a cylinder holding the piston. Furthermore, the rotation of the connecting rod at the gear assembly makes it more difficult to eliminate vibrational effects and balance the engine.

Hypocycloid gearing mechanisms in internal combustion engines have been developed to eliminate the canting in the connecting rod of conventional engines. However, hypocycloid gearing mechanisms in the prior art are extremely complicated, having multiple gears and counterweights.

An example is U.S. Pat. No. 4,026,252 to Wrin which discloses a hypocycloid engine containing eight gears and eight counterweights. The Wrin patent discloses external ring gears 74, 76, internal ring gears 78, 84, planet gears 88, 90, and output gears 104, 106 and counterweights 62, 64, 66, 67, 92, 94, 96 and 100. Furthermore, connecting rods 26, crankshaft 44, planetary crank carriers 52 and 56, and output shaft 102 travel in a circular motion or rotate which adds to the number of moving parts and further complicates the assembly and operation of the device.

SUMMARY OF THE INVENTION

In view of the foregoing, it should be apparent that there exists a need to have a simple hypocycloid gear arrangement for converting linear motion to rotary motion in an efficient manner.

The gear assembly of the present invention converts a purely linear motion in the connecting rod to a purely rotation motion in an output shaft. The gear assembly comprises a pinion shaft connected to the connecting rod by a pinion journal. A pinion carrier is placed over the pinion shaft so that both the pinion shaft and carrier move in unison. The pinion carrier travels in a circle around a center of axis which coincides with the center of axis of the output shaft. The output shaft thereby rotates on its own axis with no other consequential motion.

The hypocycloid gear assembly of the present invention improves on the prior art by providing a simple and efficient means of converting linear motion to rotational motion The gear mechanism performs this conversion using only two moving parts, the pinion shaft and the pinion carrier. The reduction of the gear assembly to two moving parts makes it easier to assembly and reduces the amount of friction generated between the moving parts.

It is an object of the present invention to provide a hypocycloid gearing mechanism which allows the piston and connecting rod to have a purely linear motion which is converted by the gearing mechanisms to a purely rotational motion in an output shaft.

It is a further object of the invention to eliminate the canting in the connecting rod so as to eliminate piston side loading and increase the efficiency of the engine.

It is a further object of the invention to direct all the energy of the piston into the connecting rod and eliminate any energy loss in a lateral direction to the connecting rod.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF DRAWINGS

FIG. 9A shows a diagram for calculating the displacement of a piston using a pinion gear assembly of the present invention, FIG. 9B shows a diagram for calculating the displacement of a piston using a conventional piston assembly;

FIG. 10 shows a graph comparing the displacement of a piston using a pinion gear assembly of the present invention, and the displacement of a piston using a conventional piston assembly;

DETAILED DESCRIPTION OF INVENTION

Figure 1:
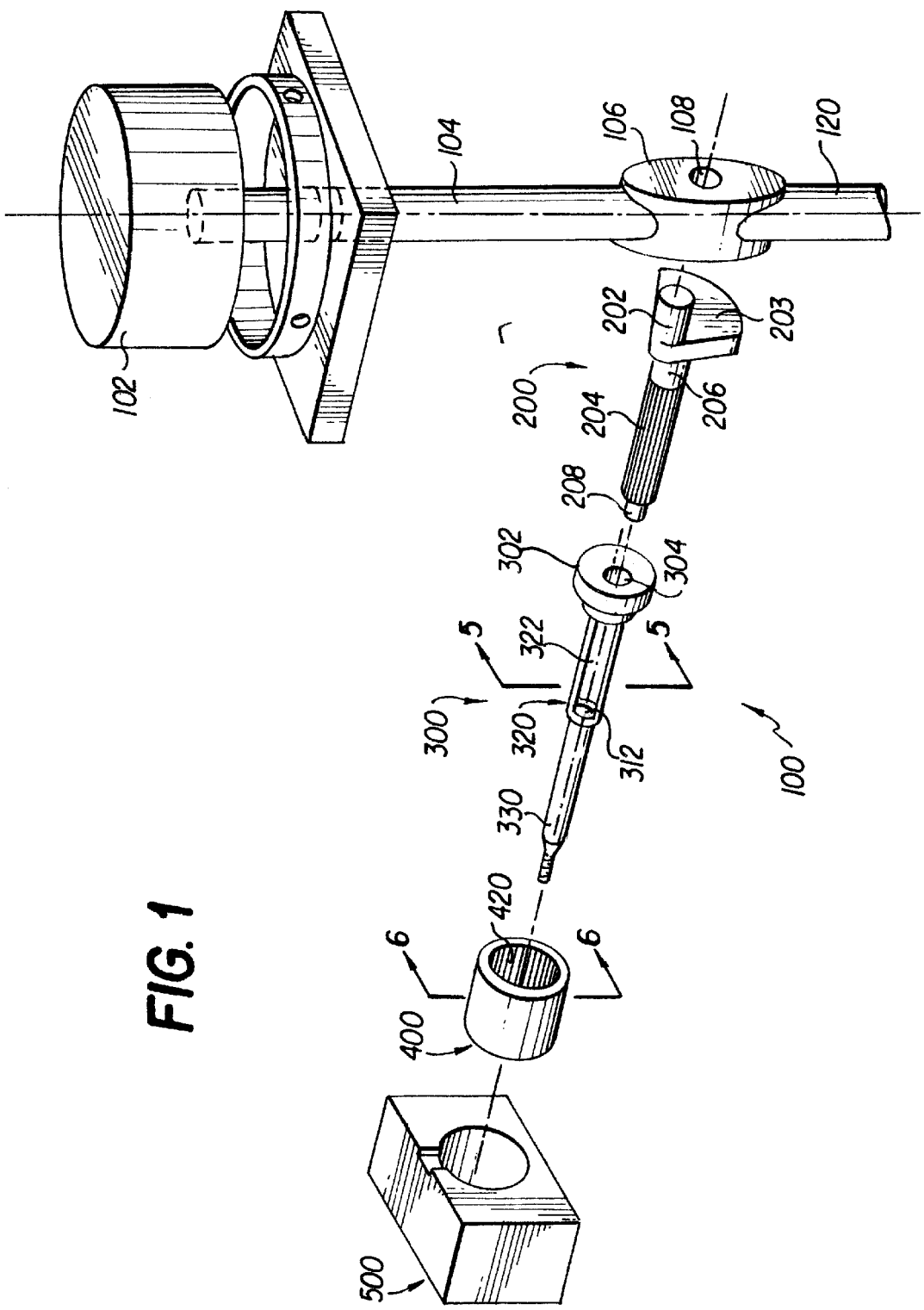
FIG. 1 is an exploded perspective view of the pinion gear assembly of the present invention.

Referring now to the drawings, FIG. 1 shows an exploded perspective view of the pinion gear assembly of the present invention 100. A piston 102 is attached to a connecting rod 104 which moves in a strictly linear reciprocating motion. This linear energy is converted to rotational energy in an output shaft 330 through the pinion gear assembly 100, as will be hereinafter explained.

Figure 2:
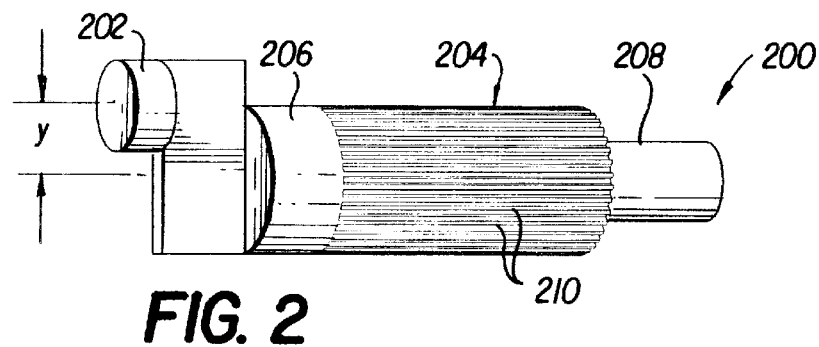
FIG. 2 is a side view of a pinion shaft of the present invention.
Figure 3:
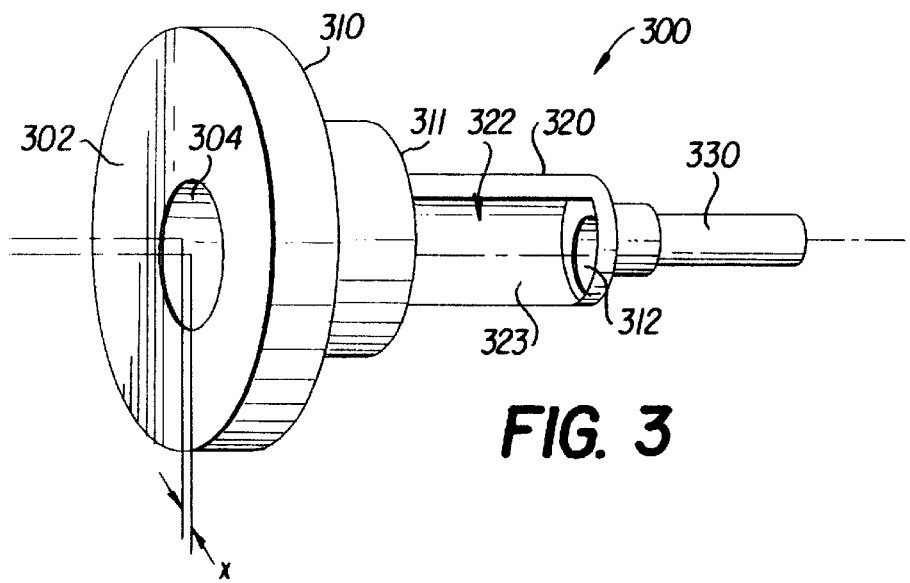
FIG. 3 is a side view of a pinion carrier assembly of the present invention.

A pinion shaft 200 is connected to the connecting rod 104. The pinion shaft is made of a single unitary piece having three sections, a pinion journal 202, a counterweight 203 and a pinion body 204. It should be noted that FIG. 2 shows the pinion shaft 200 without the counterweight 203. The pinion shaft 200 is connected to the connecting rod 104 by means of the pinion journal 202 which is inserted into a bearing hole 108 in a bearing 106. Adjacent the cylindrical pinion journal 202 is a bearing 206 and the pie-shaped counterweight 203. Attached to the bearing 206 is the pinion body 204 which is an elongate tube have teeth 210 arranged along the exterior surface of its body. At the opposite end of the pinion body 204 is a small cylinder projecting from the pinion body 204 which functions as a bearing surface 208. The centerline of the pinion journal 202 is offset from the centerline of the pinion body 204 by an amount Y which is equal to ½ PD (PD=pitch diameter of the ring gear 400) and will be explained in greater detail later.

The pinion carrier 300 is placed over the pinion shaft 200. The pinion carrier 300 is a unitary component having a proximate end plate 302, an intermediate carrier body 320 and a distal power output shaft 330. The end plate 302 includes a bearing hole 304 therein for accommodating the insertion of the pinion shaft 200. The centerline of the bearing hole 304 is offset from the centerline of the end plate 302 by an amount X which is equal to ½ PD. Connected to the end plate 302 is a bearing support disk 311 having a hole therein matching the bearing hole 304. The bearing disk 311 is not shown in FIG. 1. The two holes form a single bearing assembly 310 which along with a complementary bearing surface 312, support the pinion shaft 200 at its bearings 206 and 208.

Figure 5:
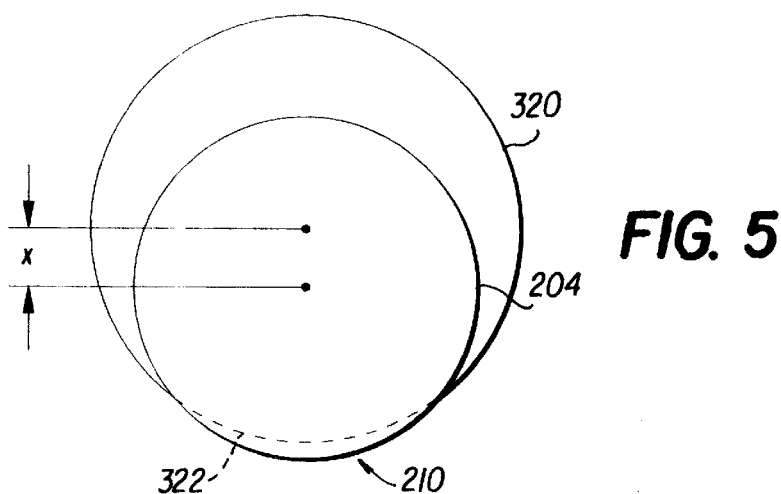
FIG. 5 is an end view along line 5—5 of FIG. 1 showing an assembled pinion carrier and pinion shaft.

The intermediate carrier body 320 is a solid circular tube having a second, slightly smaller circular tube portion cut out of its interior to define an internal cavity 323. The center of the second cut-out hole is offset from the center of the carrier body 320 such that one side of the carrier body 320 has a window 322 which opens up into the internal cavity 323. The remaining portion of the carrier body 320 forms a crescent shape around the internal cavity 323, as shown by the end view of the carrier body 320 in FIG. 5.

When the pinion shaft 200 is inserted into the pinion carrier 300, its bearings 206 and 208 engage bearings 310 and 312 on the pinion carrier 300. The teeth 210 of the pinion body 204 extend through the window 322 of the carrier body 320 due to the offset of the cut out hole in the carrier body 320.

Extending outward from the carrier body 320, opposite the end plate 302, is a power output shaft 330. The output shaft 330 is formed integrally with the carrier body 320 and moves in conjunction therewith. The centerline of the output shaft 330 coincides with the centerline of the carrier body 320 and the centerline of the end plate 302. The centerline of the pinion body 204 coincides with the centerline of the bearing hole 304. However, the centerline of the power output shaft 330 and the centerline of the pinion body 204 is offset by an amount X.

Figure 4:
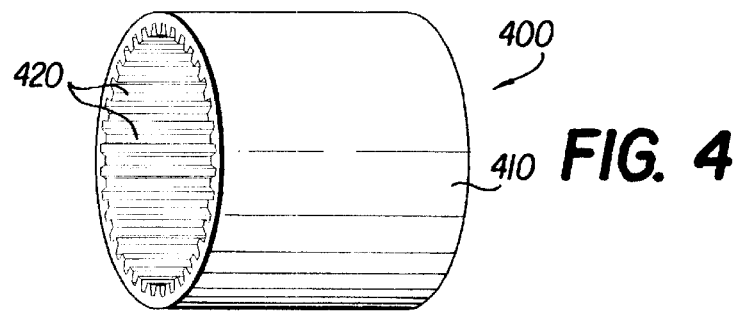
FIG. 4 is a side view of a ring gear of the present invention.

A ring gear 400, shown in FIG. 4, is placed over the carrier body 320 and extends up to, but not against, the end plate 302. The ring gear 400 is a hollow circular tube 410, having teeth 420 arranged along the interior length of the tube 410. The pitch diameter ("PD") of the ring gear 400 is the effective diameter of the interior teeth 420 of the ring gear 400. The teeth 420 of the ring gear engage the teeth 210 of the pinion body 204 which shows through the window 322 of the pinion carrier 300. The ring gear 400 is held stationary within housing 500 and does not move or rotate.

In operation, the engine produces power or force in a conventional manner by having an air-fuel mixture introduced into a cylinder (not shown) which is ignited causing a rapid expansion of the air fuel mixture, forcing the piston 102 to move in a linear direction. The piston 102 then transfers this force to the connecting rod 104, which moves in a strictly linear, reciprocating motion. The pinion journal 202 is rotatably inserted into the bearing hole 108, and moves in a linear motion with the connecting rod 104, while rotating within the bearing hole 108. However, the pinion body 204, due to the offset Y, travels in a circular motion around the pinion journal 202 while rotating in conformity with the pinion journal's rotation.

Figure 6:
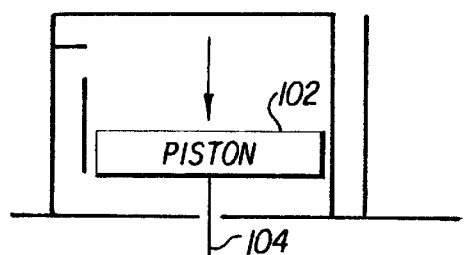
FIG. 6 is an end view along line 6—6 of FIG. 1 showing an assembled pinion gear assembly of the present invention.

FIG. 6 shows the movement of the pinion journal 202 in relation to the pinion body 204. The pinion journal 202 moves in a reciprocating linear direction and rotates on its own axis. The rotation of the pinion journal 202 then causes the pinion body 204 to rotate, shown in FIG. 6 in the counterclockwise direction. The rotation of the pinion body 204 and the offset Y then cause the pinion body 204 to travel in a circular clockwise direction within the ring gear 400.

The pinion body 204 is inserted into the internal cavity 323 of the carrier body 320 through the bearing hole 304 and imparts a circular motion to the internal cavity 323 about the carrier body's center of axis, thus causing the carrier body 320 to rotate on its own axis. The carrier body's rotation on its own axis causes the output shaft 330 to rotate on its own axis and have a purely rotational motion because the output shaft's centerline coincides with the carrier body's centerline.

Furthermore, the ring gear 400 is placed over the carrier body 320 so that the teeth 210 of the pinion body 204 meshes with the teeth 420 of the ring gear 400 as the pinon body 204 travels in a circular direction. The offsets X and Y, which are both ½ PD, and the 2 to 1 gear ratio of the pinion body 204 with the ring gear 400, synchronizes the rotation of the pinion shaft 200 and the pinion carrier 300 with the linear motion of the pinion journal 202

FIGS. 7A–7D shows the rotation of the pinion journal 202 in relation to the ring gear 400 through a full cycle of the piston. These figures are similar to FIG. 6 because the circular motion of the pinion body 204 is the same as the circular motion of the interior cavity 323.

However, while the pinion body 204 and the carrier body 320 travel in a circular motion in the same direction, their rotations are in opposite directions. This is because as the carrier body 320 travels in a circular direction within the ring gear 400, its body rotates relative to the ring gear 400 in the same direction. However, the teeth 210 of the pinion body 204, protruding through the window 322 of the carrier body 320, meshes with the teeth 420 of the stationary ring gear 400, forcing the pinion body 204 to rotate in an opposite direction to that of the carrier body 320, although the two travel in the same circular direction.

The circular motion of the interior cavity 323 is about the centerline of the end plate 302, carrier body 320, and output shaft 330, which all have the same centerline. Thus the output shaft 330 rotates on its own centerline and has a purely rotational motion. In this way, the linear energy of the connecting rod 104 is converted to rotational energy in the output shaft 330.

Due to the rotational and circular motions of the parts in the pinion gear assembly 100, uneven forces are generated in the pinion gear assembly 100 which destabilize and cause unnecessary stresses in the gear assembly. The counterweight 203 has therefore been attached to the pinion journal to balance the forces and stresses in the overall gear.

In the preferred embodiment, to ensure proper timing and operation of the pinion gear assembly 100, the gear ratio of the teeth 420 on the ring gear 400 to the teeth 210 on the pinion body is 2 to 1. The offset of the center line of the pinion journal 202 to the center line of the pinion gear body 204, Y, and the offset of the center line of the bearing hole 304 with the centerline of the carrier body 320, X, are both ½ PD. And in assembling the gear assembly, the pinion shaft 200 is inserted into the pinion carrier 300 when the piston is at top dead center, and the bearing hole 304 of the pinion carrier 300 is at its top dead center. These conditions ensure that while the pinion journal 202 moves in a linear motion, the pinion body 204 and carrier body 320 travel in a circular direction around the axis of the output shaft 330, imparting a purely rotational motion to the output shaft 330.

Furthermore, proper assembly of the pinion gear assembly 100 requires that the pinion shaft 200 be inserted into the pinion carrier 300 when the piston is at top dead center, the bearing hole 304 is at the top apex of its circular motion, and the piston journal 202 is at the top apex of its linear motion. This ensures that the piston journal 202 moves in strictly linear motion and that the pinion shaft teeth 210 with the ring gear teeth 420 properly mesh. If the pinion gear shaft 200 is inserted into the carrier assembly 300 by any other orientation, then the pinion journal 202 will not move in a strictly linear direction, but will have a slightly canted motion.

With the purely linear motion of the connecting rod 104 converted to a purely rotational motion of the output shaft 330, energy losses are reduced by eliminating any side thrusts of the connecting rod 104, and imbalances in the gears which lead to unnecessary friction and reduce the overall efficiency of the engine.

FIG. 9A shows a diagram for computing the displacement and torque for a conventional engine. FIG. 9B shows a diagram for computing the displacement and torque of the hypocycloid engine of the present invention. The displacement L, and the torque T, in a conventional engine is:

$$L = r_2 * \cos(\phi) + (r_1^2 - r_1^2(1 - \cos(\phi))^2)^{1/2}$$

$$T = F * r_2 * ((r_2/\cos(\phi))^2 - ((L * \sin(\phi))^2 + r_1^2))/(2 * L * r_1 * \sin(\phi))$$

Figure 11:
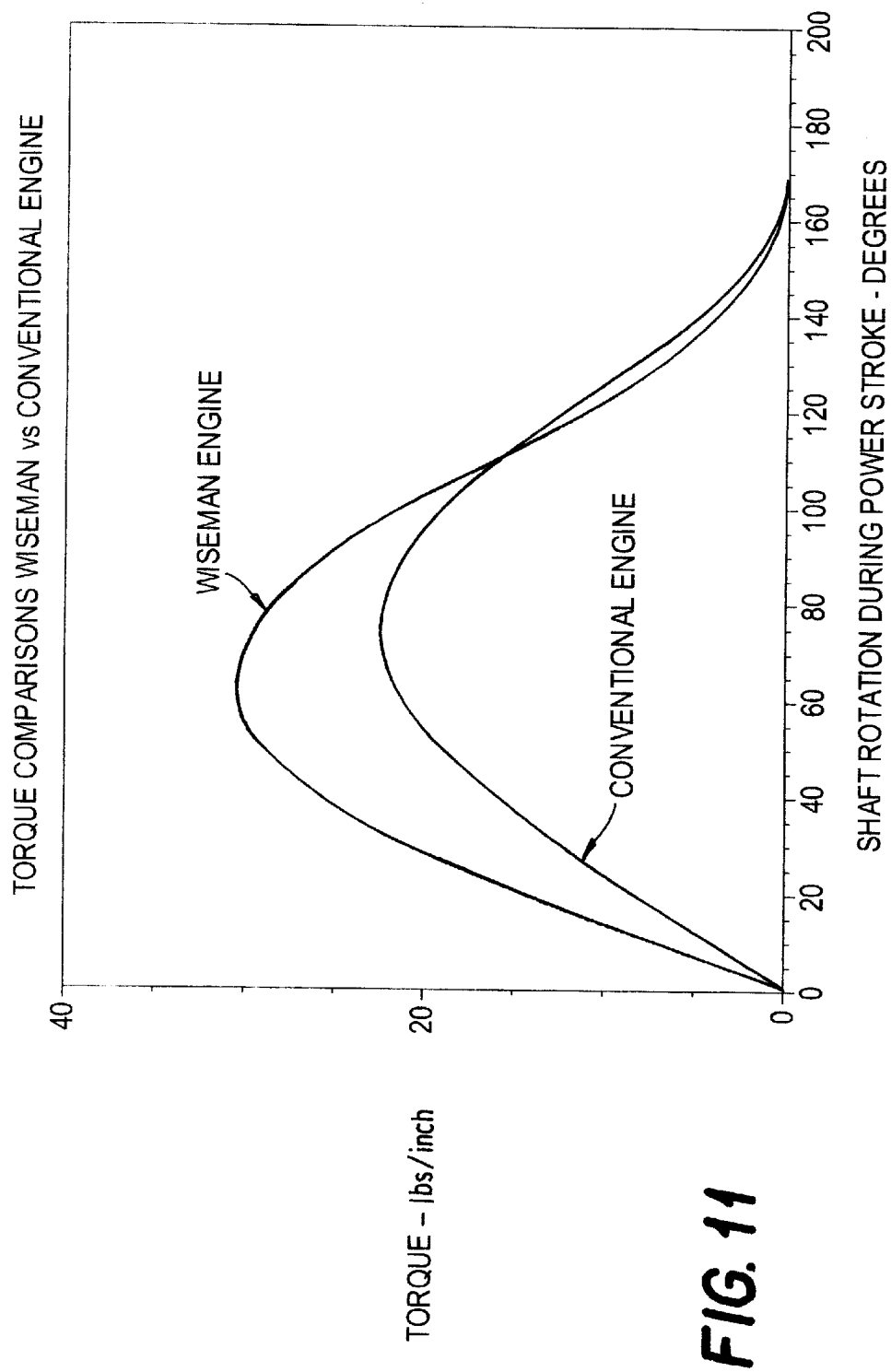
FIG. 11 shows a graph comparing the torque generated by an engine using the pinion gear assembly of the present invention, and the torque generated by a conventional engine.
Figure 12:
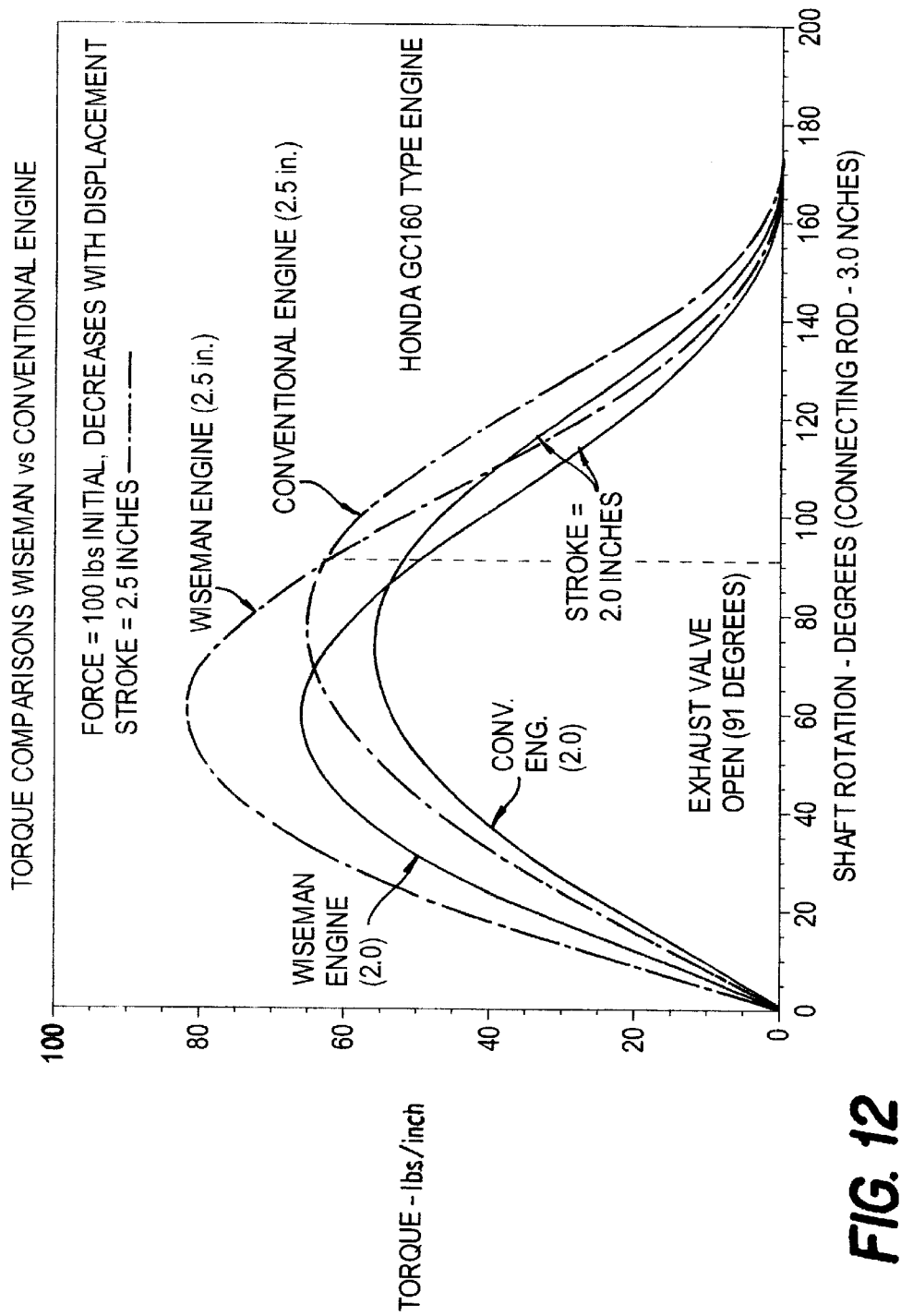
FIG. 12 shows a graph combining the graphs of FIGS. 11 and 12.

The displacement L, and torque T for engine using hypocycloid gear assembly of the present invention is:

$$L = r_2 * (1 - \cos(\phi))$$

$$T = F * r_2 * \sin(\phi)$$

where;
L=displacement of the piston from top dead center
F=force applied to piston length
$r_1$=length of the connecting rod
$r_2$=radius of crank shaft or pinion journal
$\phi$=rotation angle of the power shaft FIG. 10 puts the displacement equations for a conventional engine and a hypocycloid engine of the present invention into graph form. FIG. 11 puts the torque equations for a conventional engine and a hypocycloid engine of the present invention into graph form. And FIG. 12 combines the graphs of FIGS. 10 and 11 for comparison.

The preferred embodiment of the invention has been described with respect to a two-stroke internal combustion engine, it is contemplated that the pinion gear assembly of the present invention be used with any other type of engine, including but not limited to, a four-stroke engine and a manually powered engine. Furthermore, the pinion gear assembly 100 can be used in a variety of applications where linear energy needs to be converted to rotation energy or vice versa, such as hydraulic systems, compressors, pumps, and belt drive systems to name a few.

Figure 8:
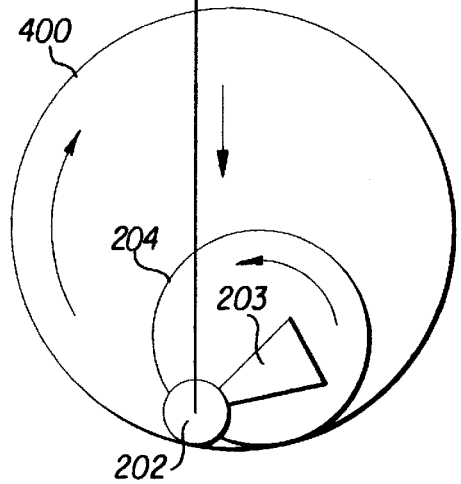
FIG. 8 shows the pinion gear assembly of the present invention connected to two pistons.
Figure 8:
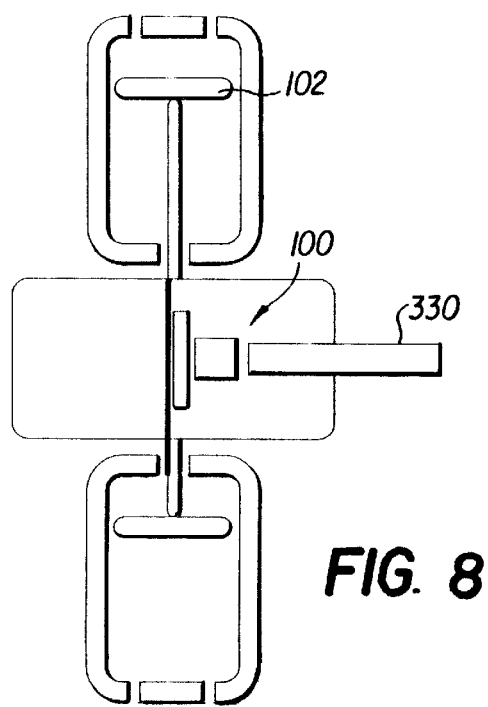
Figure 7A:
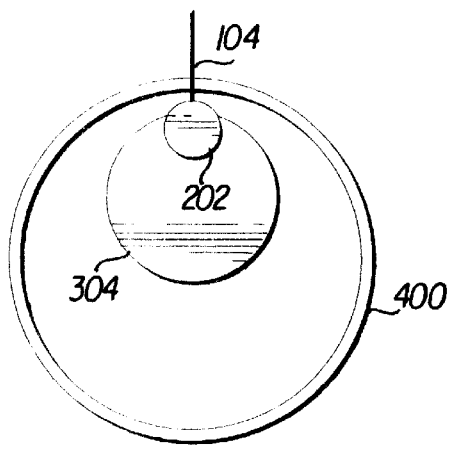
FIGS. 7A–7D is an end view of an assembled pinion carrier assembly showing the position of the bearing hole in relation to the ring gear as the piston travels through a fall stroke.
Figure 7B:
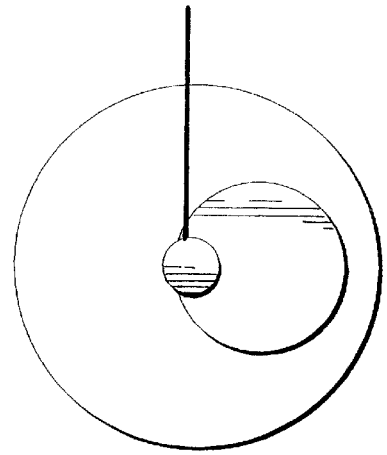
Figure 7C:
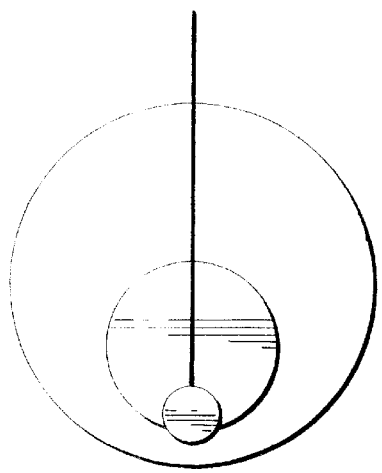
Figure 7D:
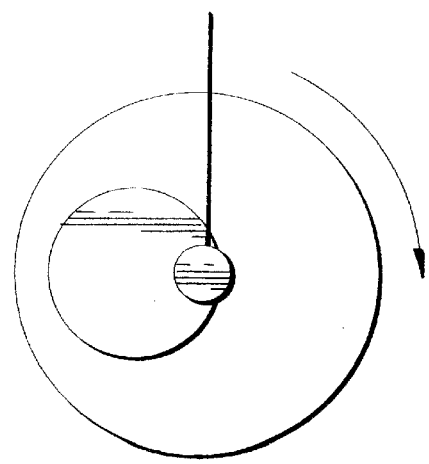

It is also contemplated that a second piston and connecting rod 120 be attached to the bearing 106 to provide a 360 degree power stroke and increase the power output of the output shaft 330, as shown in FIG. 8.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extend required by the appended claims and the applicable rules of law.

What is claimed is:

1. A hypocycloid gear assembly comprising:
   a pinion shaft having a pinion journal and a pinion body;
   a pinion carrier having an end plate, a carrier body with an internal cavity, and an output shaft, the internal cavity being a cylindrical tube-shaped hole whose centerline is offset from the centerline of the carrier body to form a window in the carrier body to expose the internal cavity, and the remaining portion of the carrier body forming a crescent around the internal cavity; and
   wherein in operation the pinion journal travels in a purely linear motion and the output shaft in a purely rotational motion.

2. The hypocycloid gear assembly of claim 1 further comprising:
   the pinion body having teeth on its exterior surface, the pinion body being inserted into the internal cavity of the carrier body so that its teeth protrude through the window in the carrier body.

3. The hypocycloid gear assembly of claim 1 further comprising:
   a ring gear having teeth on its interior surface and placed over the carrier body;
   wherein the teeth of the pinion body meshes with the teeth of the ring gear.

4. The hypocycloid gear assembly of claim 3 further comprising:
   the gear ratio of the ring gear to the pinion body being 2 to 1.

5. The hypocycloid gear assembly of claim 4 further comprising:
   the pinion journal being connected to a engine piston.

6. The hypocycloid gear assembly of claim 1 further comprising:
   the centerline of the pinion journal being offset from the centerline of the pinion body by and amount Y and the centerline of the internal cavity being offset from the centerline of the carrier body by an amount X.

7. The hypocycloid gear assembly of claim 6 further comprising:
   the pinion body and the internal cavity having the same centerline; and the carrier body and the output shaft having the same centerline.

8. The hypocycloid gear assembly of claim 7 further comprising:

the pinion body being placed in the internal cavity of the pinion carrier;

wherein the pinion body and the internal cavity travel in a circular direction about the centerline of the carrier body.

9. The hypocycloid gear assembly of claim 8 further comprising:

a ring gear having a pitch diameter of PD;

wherein X and Y are equal to ½ PD.

10. The hypocycloid gear assembly of claim 9 further comprising:

the pinion journal being at top dead center when internal cavity is at top dead center.

11. The hypocycloid gear assembly of claim 10 further comprising:

the pinion journal be connected to a engine piston.

12. The hypocycloid gear assembly of claim 1 further comprising:

the pinion shaft having two bearing surfaces on opposite ends of the pinion body;

the pinion carrier having a bearing hole in the end plate serving as a bearing surface at one end of the carrier body, and a second bearing surface on an opposite end of the carrier body; and wherein the two bearing surfaces of the pinion carrier engage the two bearing surfaces of the pinion shaft.

13. The hypocycloid gear assembly of claim 1 further comprising:

the pinion journal being offset from the pinion body; and a counterweight located at the joint of the pinion journal and the pinion body.

14. An engine using a hypocycloid gear assembly comprising:

an engine piston;

a connecting rod;

a pinion shaft having a pinion journal and a pinion body;

a pinion carrier having an end plate, a carrier body having an internal cavity, and an output shaft, the internal cavity being a cylindrical tube-shaped hole whose centerline is offset from the centerline of the carrier body to form a window in the carrier body to expose the internal cavity, and the remaining portion of the carrier body forming a crescent around the internal cavity;

wherein the pinion journal is attached to the connecting rod and the connecting rod is attached to the piston; and wherein in operation the pinion journal travels in a purely linear motion and the output shaft has a purely rotational motion.

15. The engine using a hypocycloid gear assembly of claim 14 further comprising:

the pinion body having teeth on its exterior surface, the pinion body being inserted into the internal cavity of the carrier body so that its teeth protrude through the window in the carrier body.

16. The engine using a hypocycloid gear assembly of claim 15 further comprising:

a ring gear having teeth on its interior surface and placed over the carrier body; and wherein the teeth of the pinion body meshes with the teeth of the ring gear.

17. The engine using a hypocycloid gear assembly of claim 16 further comprising:

the gear ratio of the ring gear to the pinion body being 2 to 1.

18. The engine using a hypocycloid gear assembly of claim 14 further comprising:

the centerline of the pinion journal being offset from the centerline of the pinion body by and amount Y and the centerline of the internal cavity being offset from the centerline of the carrier body by an amount X.

19. The engine using a hypocycloid gear assembly of claim 18 further comprising:

the pinion body and the internal cavity having the same centerline; and the carrier body and the output shaft having the same centerline.

20. The engine using a hypocycloid gear assembly of claim 19 further comprising:

the pinion body being placed in the internal cavity of the pinion carrier; and wherein the pinion body and the internal cavity travel in a circular direction about the centerline of the carrier body.

21. The engine using a hypocycloid gear assembly of claim 20 further comprising:

a ring gear having a pitch diameter of PD; and wherein X and Y are equal to ½ PD.

22. The engine using a hypocycloid gear assembly of claim 21 further comprising:

the pinion journal being at top dead center when internal cavity is at top dead center.

23. The engine using a hypocycloid gear assembly of claim 22 further comprising:

the pinion journal be connected to a engine piston.

24. The engine using a hypocycloid gear assembly of claim 14 further comprising:

the pinion shaft having two bearing surfaces on opposite ends of the pinion body;

the pinion carrier having a bearing hole in the end plate serving as a bearing surface at one end of the carrier body, and a second bearing surface on an opposite end of the carrier body; and wherein the two bearing surfaces of the pinion carrier engage the two bearing surfaces of the pinion shaft.

25. The engine using a hypocycloid gear assembly of claim 14 further comprising:

the pinion journal being offset from the pinion body; and a counterweight located at the joint of the pinion journal and the pinion body.

* * * * *